(12) United States Patent
Mizutani et al.

(10) Patent No.: US 8,803,389 B2
(45) Date of Patent: Aug. 12, 2014

(54) STATOR AND MOTOR PROVIDED WITH THE STATOR

(75) Inventors: Tatsuhiko Mizutani, Toyota (JP); Masahiro Sakai, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 281 days.

(21) Appl. No.: 12/975,593

(22) Filed: Dec. 22, 2010

(65) Prior Publication Data

US 2011/0148246 A1    Jun. 23, 2011

(30) Foreign Application Priority Data

Dec. 22, 2009    (JP) ................................ 2009-290299

(51) Int. Cl.
*H02K 1/06* (2006.01)
*H02K 5/24* (2006.01)
*H02K 5/04* (2006.01)
*H02K 1/18* (2006.01)
*H02K 1/16* (2006.01)
*H02K 3/52* (2006.01)

(52) U.S. Cl.
CPC ................. *H02K 1/18* (2013.01); *H02K 1/185* (2013.01); *H02K 1/16* (2013.01); *H02K 3/522* (2013.01); *H02K 5/04* (2013.01); *H02K 5/24* (2013.01)
USPC ............... 310/89; 310/216.008; 310/216.009; 310/259

(58) Field of Classification Search
CPC ......... H02K 1/06; H02K 1/148; H02K 3/522; H02K 5/04; H02K 5/24; H02K 5/06
USPC .............. 310/89, 216.009, 216.004, 216.008, 310/259
IPC ........................................................ H02K 1/06
See application file for complete search history.

(56) References Cited

U.S. PATENT DOCUMENTS 4,297,784 A * 11/1981 Vagman .......................... 29/596
4,841,183 A * 6/1989 Dohogne et al. ................. 310/90
(Continued)

FOREIGN PATENT DOCUMENTS

CN    101523696 A    9/2009
JP    06-046544 A    2/1994
(Continued)

OTHER PUBLICATIONS

Nakano et al, JP 2008-011638, English translation, Jan. 2008.*

(Continued)

*Primary Examiner* — John K Kim
(74) *Attorney, Agent, or Firm* — Gifford, Krass, Sprinkle, Anderson & Citkowski, P.C.

(57) ABSTRACT

A stator includes a stator core formed from a plurality of split cores arranged in a circumferential direction, and a cylindrical body that surrounds the stator core from a periphery and secures the stator core. The split cores each have a first end portion on one end in the circumferential direction, and a second end portion on the other end in the circumferential direction. The first end portion has a protruding portion that protrudes outward in the circumferential direction, and the second end portion has a depressed portion that is depressed inward in the circumferential direction and fits together with the protruding portion of the first end portion of an adjacent split core.

11 Claims, 6 Drawing Sheets

(56) References Cited

U.S. PATENT DOCUMENTS

| | | | |
|---|---|---|---|
| 4,881,001 A * | 11/1989 | Patel et al. | 310/216.052 |
| 5,113,103 A * | 5/1992 | Blum et al. | 310/89 |
| 7,667,367 B2 | 2/2010 | Matsuo et al. | |
| 8,102,092 B2 * | 1/2012 | Tomohara et al. | 310/216.008 |
| 2002/0062548 A1* | 5/2002 | Ketterer et al. | 29/596 |
| 2005/0073204 A1* | 4/2005 | Puterbaugh et al. | 310/89 |
| 2005/0212377 A1* | 9/2005 | Wang et al. | 310/259 |
| 2005/0269891 A1* | 12/2005 | Shinoki et al. | 310/180 |
| 2007/0035191 A1* | 2/2007 | Leclerc | 310/91 |
| 2007/0096587 A1* | 5/2007 | Ionel et al. | 310/218 |
| 2007/0210658 A1* | 9/2007 | Terauchi et al. | 310/68 B |
| 2008/0122304 A1* | 5/2008 | Makino et al. | 310/71 |
| 2008/0136277 A1* | 6/2008 | Esders | 310/87 |
| 2009/0026872 A1* | 1/2009 | Tomohara et al. | 310/216 |
| 2009/0026873 A1* | 1/2009 | Matsuo et al. | 310/216 |
| 2010/0001611 A1* | 1/2010 | Utaka et al. | 310/216.009 |
| 2010/0052465 A1* | 3/2010 | Hayashi | 310/216.009 |
| 2011/0148246 A1* | 6/2011 | Mizutani et al. | 310/216.009 |

FOREIGN PATENT DOCUMENTS

| | | | |
|---|---|---|---|
| JP | 2001339881 A | | 12/2001 |
| JP | 2005-073319 A | | 3/2005 |
| JP | 2006-340509 A | | 12/2006 |
| JP | 2007-129835 A | | 5/2007 |
| JP | 2008011638 A | * | 1/2008 |
| JP | 2008-113529 A | | 5/2008 |
| JP | 2009148050 A | | 7/2009 |

OTHER PUBLICATIONS

Japanese Office Action issued on Nov. 8, 2011 from JP 2009-290299 with partial English translation.

* cited by examiner

STATOR AND MOTOR PROVIDED WITH THE STATOR

CROSS-REFERENCE TO RELATED APPLICATIONS

This application claims priority to Japanese Patent Application No. 2009-290299 filed on Dec. 22, 2009, which is incorporated herein by reference in its entirety including the specification, drawings and abstract.

BACKGROUND OF THE INVENTION

1. Field of the Invention

The invention relates to a stator and a motor provided with the stator. More particularly, the invention relates to an improvement of the structure of a stator having a stator core formed from a plurality of split cores arranged in a circumferential direction.

2. Description of the Related Art

A motor has a rotor, and a stator that is arranged around the rotor. The stator has a coil. When current passes through this coil, a rotating magnetic field is consequently generated. The electromagnetic action that operates between this rotating magnetic field and the rotor causes the rotor to rotate.

The stator has a stator core that has a hollow cylindrical shape. In order to improve manufacturing efficiency, including the efficiency of forming the stator core, there is an example of the stator core being formed from a plurality of split cores arranged in a circumferential direction. A stator core formed in this way is manufactured by inserting the split cores that have been arranged in the circumferential direction into the inner periphery of an annular cylindrical body, and then shrink fitting this cylindrical body.

Japanese Patent Application Publication No. 2009-148050 (JP-A-2009-148050) describes a stator having a stator core formed by a plurality of split cores arranged in a circumferential direction. In JP-A-2009-148050, heat deformation of the split cores is suppressed such that roundness on the stator core inner peripheral side is stabilized by including a surface that is orthogonal to the axial direction on a portion where adjacent split cores abut against one another, and welding the split cores together at this surface.

In the process of inserting the split cores into the cylindrical body and shrink fitting the cylindrical body, which is a manufacturing process of the stator core described above, the split cores are clamped and secured by heat shrinking the cylindrical body. At this time, the temperature distribution of the entire cylindrical body is uneven, so the clamping force on the split cores from the cylindrical body during heat shrinking also ends up being uneven. As a result, the uneven clamping force may cause the split cores to come out of position, which would adversely affect the roundness on the inner peripheral side of the stator core. Although it is possible to make the clamping force even by adjusting the temperature of the entire cylindrical body, doing so would increase the size and complexity of the device, and end up increasing manufacturing time and cost.

SUMMARY OF THE INVENTION

The invention thus provides a stator in which the roundness on the inner peripheral side of a stator core formed by a plurality of split cores is able to be improved, as well as a motor provided with this stator.

A first aspect of the invention relates to a stator that includes a stator core formed from a plurality of split cores arranged in a circumferential direction, and a cylindrical body that surrounds the stator core from a periphery and secures the stator core. The split cores each have a first end portion on one end in the circumferential direction, and a second end portion on the other end in the circumferential direction. The first end portion has a protruding portion that protrudes outward in the circumferential direction, and the second end portion has a depressed portion that is depressed inward in the circumferential direction and fits together with the protruding portion of the first end portion of an adjacent split core.

A second aspect of the invention relates to a motor that includes the stator according to the first aspect described above.

With the stator according to the first aspect of the invention and the motor according to the second aspect of the invention, the roundness on the inner peripheral side of a stator that is formed by a plurality of split cores is able to be improved.

BRIEF DESCRIPTION OF THE DRAWINGS

The foregoing and/or further objects, features and advantages of the invention will become more apparent from the following description of example embodiments with reference to the accompanying drawings, in which like numerals are used to represent like elements and wherein.

DETAILED DESCRIPTION OF EMBODIMENTS

Figure 1:
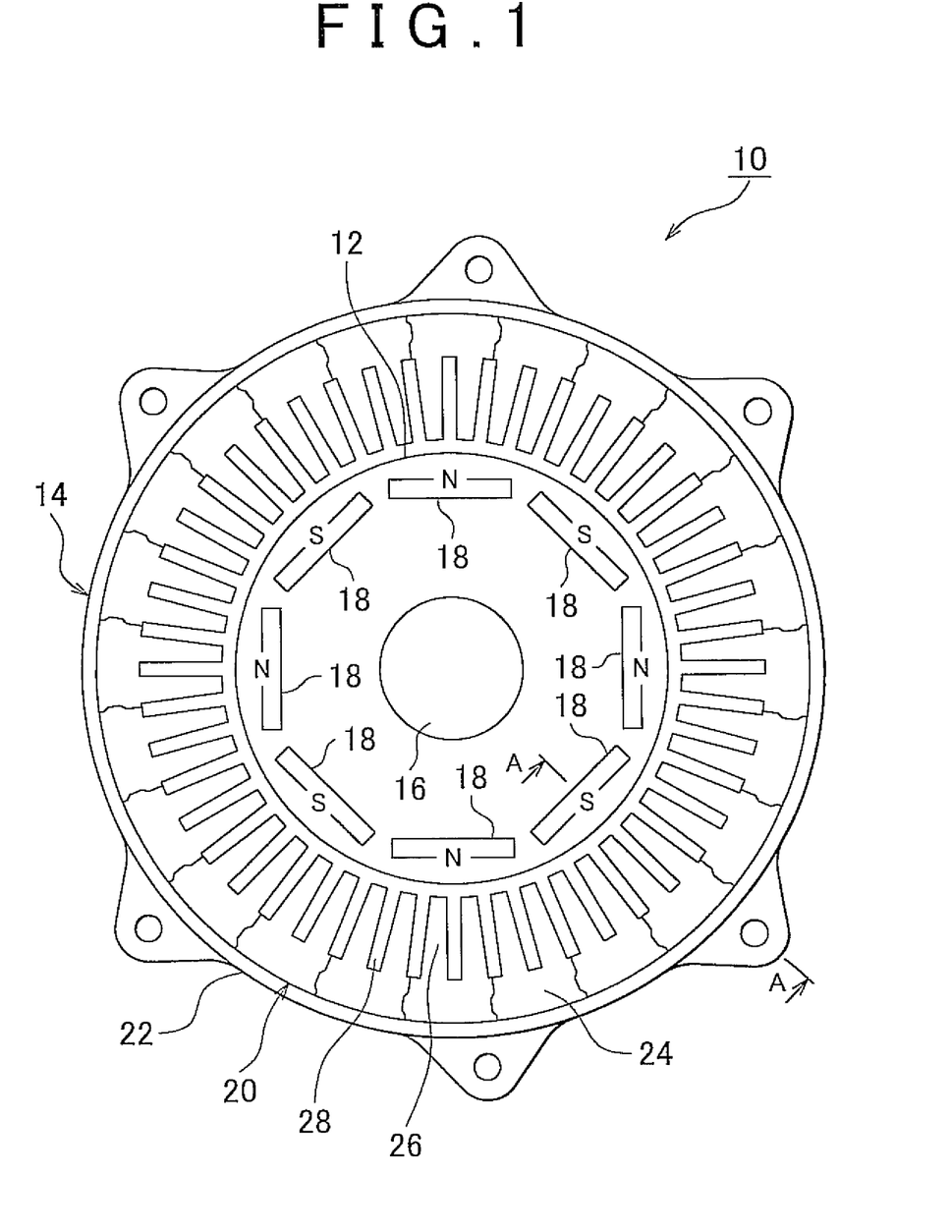
FIG. 1 is a view of the structure of a motor according to an example embodiment of the invention.
Figure 2:
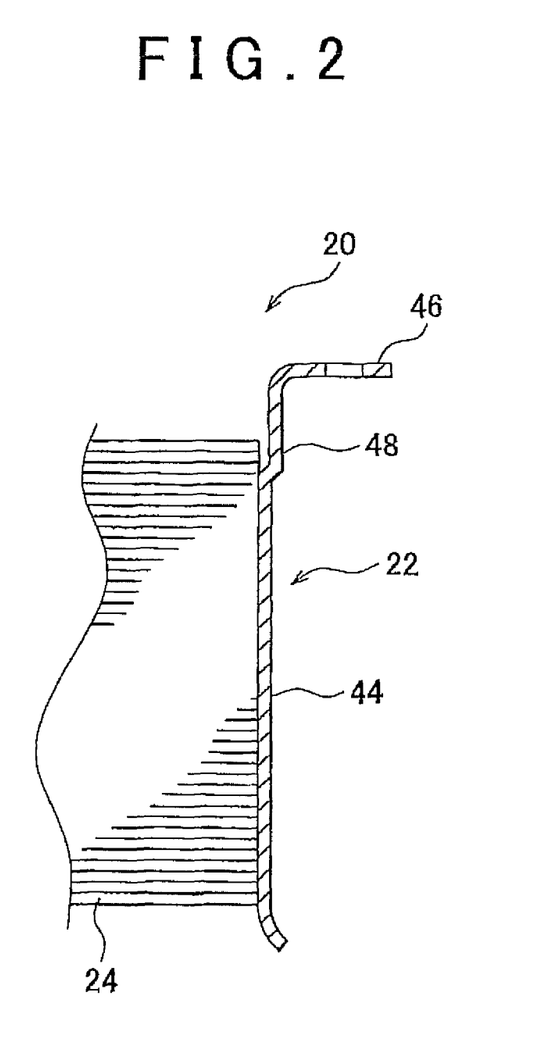
FIG. 2 is a sectional view taken along line A-A in FIG. 1.

Hereinafter, example embodiments of a stator, and a motor provided with this stator, of the invention will be described with reference to FIGS. 1 and 2. FIG. 1 is a view of the structure of a motor 10 according to this example embodiment, and FIG. 2 is a sectional view taken along line A-A in FIG. 1.

The motor 10 includes a rotor 12, a stator 14, and a case, not shown, that houses the rotor 12 and the stator 14. The stator 14 is arranged on an inner peripheral surface of the case, and the rotor 12 is rotatably arranged on the inner periphery of the stator 14.

The rotor 12 has a cylindrical magnetic body that is concentric with a rotating shaft 16, and is formed by stacking magnetic steel sheets together in the axial direction, for example. Eight permanent magnets 18 are arranged in the circumferential direction on the rotor 12, as shown in FIG. 1. Incidentally, this number of permanent magnets 18 is only an example. In this example embodiment, the permanent magnets 18 are embedded in holes formed extending in the axial direction in the rotor 12. However, the invention is not limited to this. For example, the permanent magnets 18 may also be arranged on the outer periphery of the rotor 12. The rotating shaft 16 is rotatably supported by bearings, not shown, of the case. Also in this example embodiment, a case is described in which the rotor 12 is formed by magnetic steel sheets that have been stacked together, but the invention is not limited to this structure. For example, the rotor 12 may also be formed from a powder magnetic core.

The stator 14 is arranged with a small gap around the rotor 12. The stator 14 includes a stator core 20 that has a hollow cylindrical shape, and a cylindrical body 22 that surrounds the stator core 20 from the periphery and secures the stator core 20. In this example embodiment, the stator core 20 is formed by split cores 24 that are split in the circumferential direction. Twenty-four of these split cores 24 are arranged in the circumferential direction. Incidentally, this number of split cores 24 is only an example. The structures of the cylindrical body 22 and the split cores 24 will be described in detail later.

The stator core 20 is a magnetic body, and is formed by stacking magnetic steel sheets together in the axial direction, for example. Incidentally, in this example embodiment, a case is described in which the stator core 20, i.e., the split cores 24, are formed by magnetic steel sheets that have been stacked together, but the invention is not limited to this structure. For example, the split cores 24 may also be formed from powder magnetic cores.

Teeth 26 that protrude to the inner peripheral side of the stator core 20 and are arranged at predetermined intervals in the circumferential direction are formed on the stator core 20. A conducting wire passes through slots 28 that are groove-shaped spaces between the teeth 26. This conducting wire forms a coil, not shown, by being wound around the teeth 26 while passing through the slots 28. The coil in this example embodiment is formed wound in an annular shape in advance. The coil becomes wound around the teeth 26 by inserting the teeth 26 from the outer peripheral side into this coil, and arranging the split cores 24.

In the motor 10 structured in this way, a rotating magnetic field is generated in the stator 14 by passing current through the coil. The attraction force of this rotating magnetic field acts on the rotor 12 having the permanent magnets 18, causing the rotor 12 to rotate.

Figure 3:
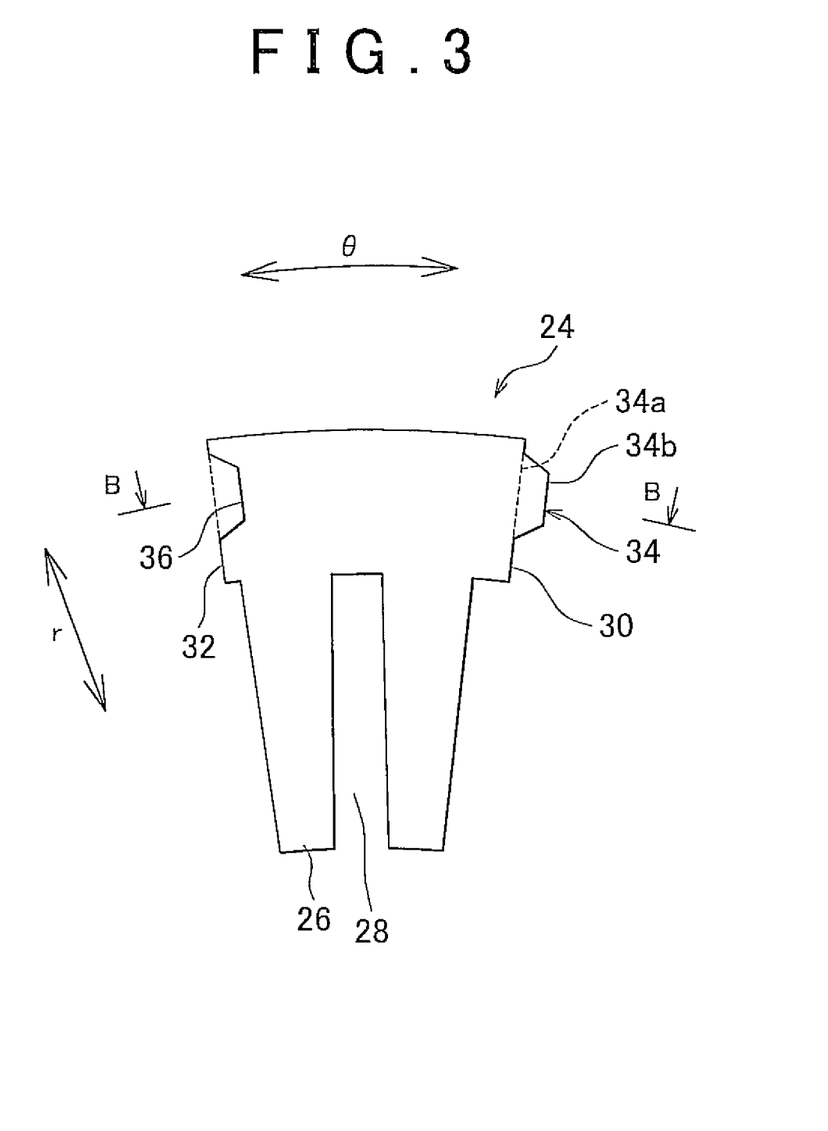
FIG. 3 is a view of a split core according to the example embodiment of the invention.
Figure 4:
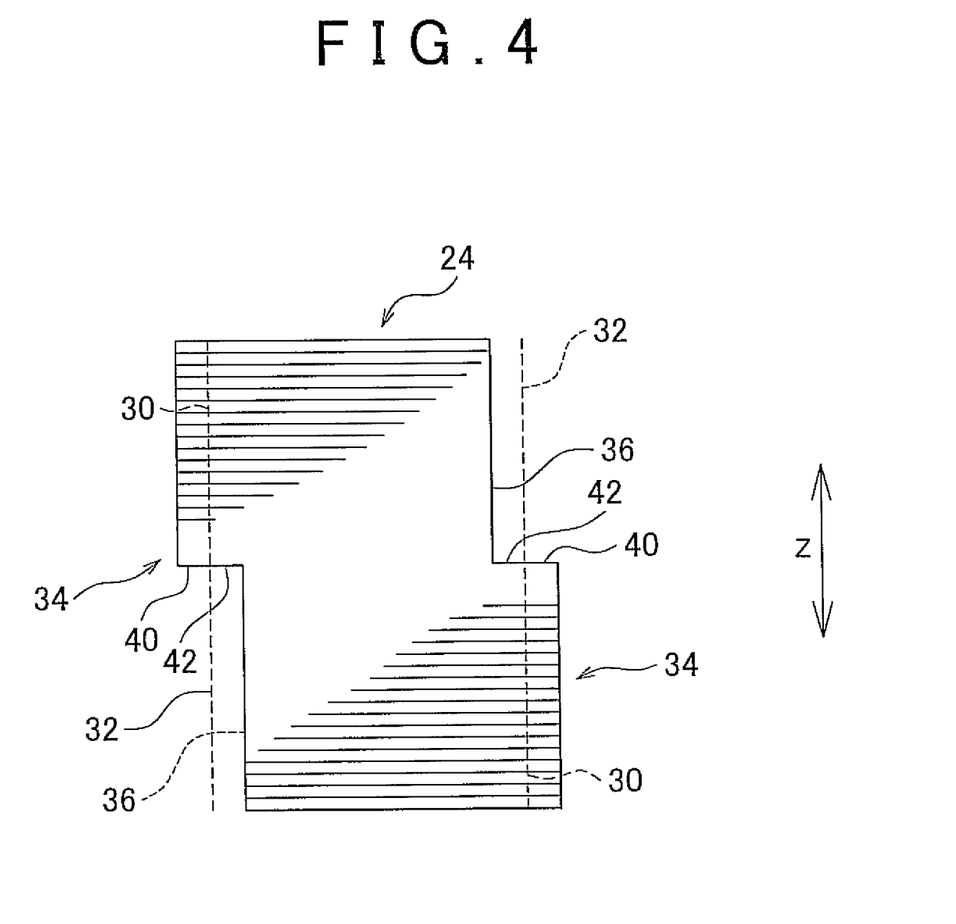
FIG. 4 is a sectional view taken along line B-B in FIG. 3.
Figure 5:
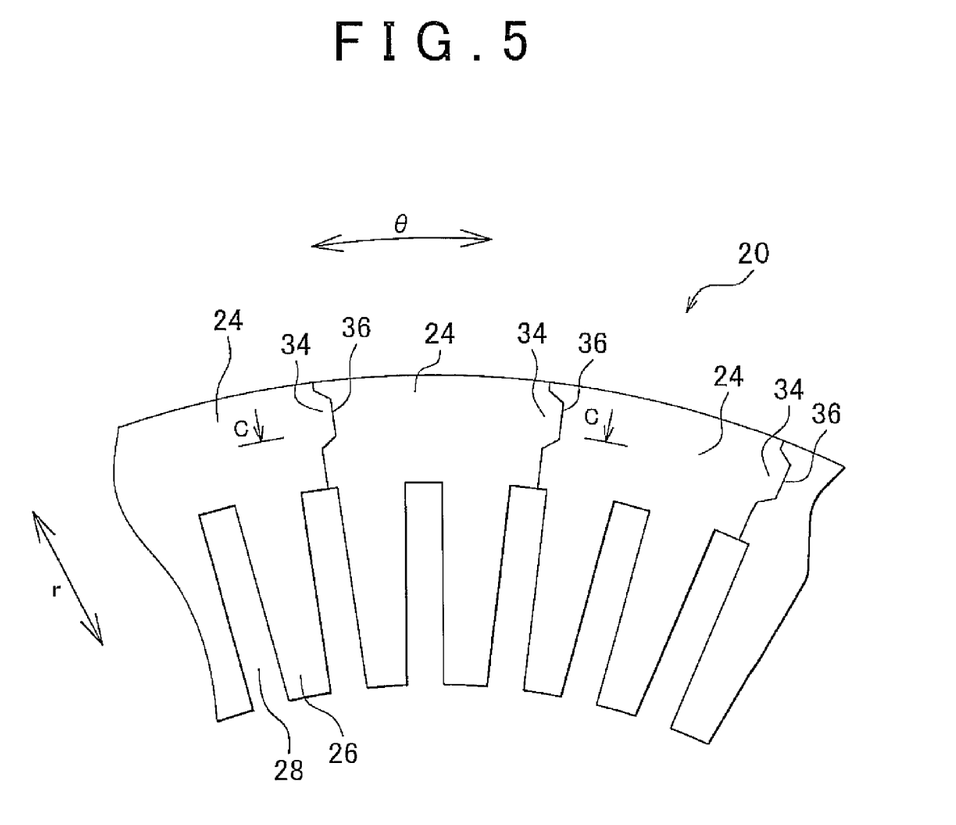
FIG. 5 is a view of an area of a portion of a stator core according to the example embodiment of the invention.
Figure 6:
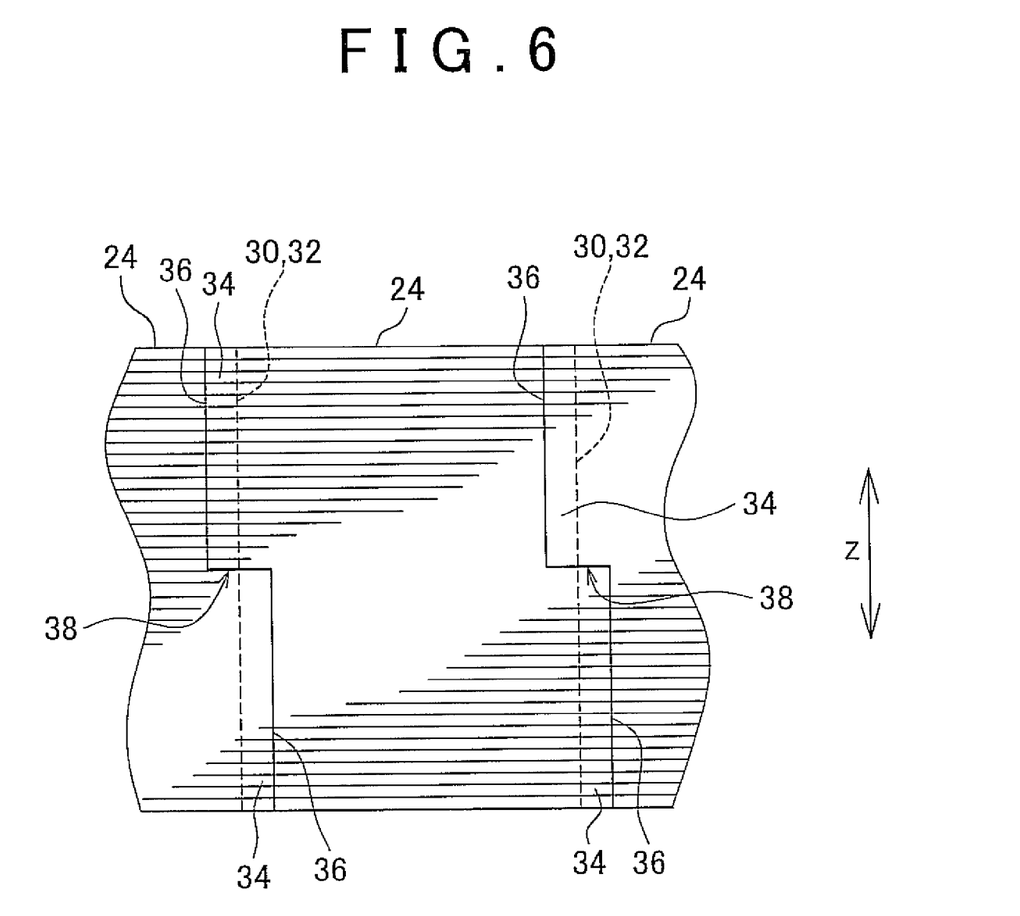
FIG. 6 is a sectional view taken along line C-C in FIG. 5.

Next, the structure of the split cores 24 will be described with reference to FIGS. 3 to 6. FIG. 3 is a view of one of the split cores 24, FIG. 4 is a sectional view taken along line B-B in FIG. 3, FIG. 5 is a view of an area of a portion of the stator core 20, and FIG. 6 is a sectional view taken along line C-C in FIG. 5. Incidentally, arrows r, θ, and z in the drawings indicate the radial direction, the circumferential direction, and the axial direction, respectively.

The split cores 24 in this example embodiment are formed by laminating magnetic steel sheets together in the axial direction. More specifically, the split cores 24 are formed by stamping out thin magnetic steel sheets with a press, stacking a predetermined number of the stamped out magnetic steel sheets in the axial direction, and joining the stacked plurality of magnetic steel sheets together by a process such as pressure crimping.

The split cores 24 in this example embodiment each have a first end portion 30 at one end in the circumferential direction, and a second end portion 32 at the other end in the circumferential direction. The first end portion 30 has a protruding portion 34 that protrudes out in the circumferential direction, and the second end portion 32 has a depressed portion 36 that is depressed inward in the circumferential direction. The depressed portion 36 is formed so as to fit together with the protruding portion 34 of the first end portion 30 of the adjacent split core 24, as shown in FIG. 5.

With this structure, the protruding portion 34 and the depressed portion 36 of adjacent split cores 24 fit together when the split cores 24 are arranged in the circumferential direction, so movement of the split cores 24 in the radial direction is restricted. Therefore, even if the clamping force on the split cores 24 from the cylindrical body 22 is uneven in the process of inserting the split cores 24 into the cylindrical body 22 and shrink fitting the cylindrical body 22, the split cores 24 are inhibited from coming out of position in the radial direction, so roundness can be improved.

Also, the protruding portion 34 is formed so as to become gradually narrower from a base portion 34a toward an apex portion 34b of the protruding portion 34, and the depressed portion 36 is formed corresponding to this protruding portion 34. Here, the base portion 34a is a portion where the protruding portion 34 connects with the first end portion 30, and is the portion indicated by the broken line in FIG. 3. On the other hand, the apex portion 34b is a portion that faces the base portion 34a, and is the end portion of the protruding portion 34 that is on the outside in the circumferential direction. In this example embodiment, when the split core 24 is viewed from the axial direction, as shown in FIG. 3, the protruding portion 34 has a trapezoidal shape in which the base portion 34a is the lower base and the apex portion 34b is the upper base. However, the invention is not limited to this structure. That is, the protruding portion 34 may also have a triangular shape, for example, as long as it is has a shape such as that described above, i.e., a wedge shape. Also, in this example embodiment, the protruding portion 34 is positioned in the middle of the first end portion 30. However, the invention is not limited to this. For example, the protruding portion 34 may also be positioned on either end of the first end portion 30 in the radial direction.

Having the protruding portion 34 be formed in a shape such as that described above, i.e., a wedge shape, makes it easy to position the split cores 24 when arranging them in the circumferential direction. This is effective particularly when inserting the teeth 26 into the annular coil from the outer peripheral side and arranging the split cores 24, as described above. In this case, all of the split cores 24 that form the stator core 20 are simultaneously inserted into the coil from the outer peripheral side and arranged. During this arranging process, the gaps between adjacent split cores 24 gradually become smaller. At this time, the wedge-shaped protruding portion 34 and the depressed portion 36 that faces the wedge-shaped protruding portion 34 fit together while being guided together, which makes it easy to position the split cores 24.

Also, the protruding portion 34 and the depressed portion 36 in this example embodiment have abutting portions 38 that face each other and abut against each other to restrict the movement of the split cores 24 in the axial direction when the protruding portion 34 and the depressed portion 36 are fitted together, as shown in FIG. 6. More specifically, the abutting portion 38 includes an outer surface 40 of the protruding portion 34 in the axial direction, and an inner surface 42 of the depressed portion 36 in the axial direction, as shown in FIG. 4.

The split cores 24 in this example embodiment are formed by stacking magnetic steel sheets in the axial direction, as described above. The magnetic steel sheets that are stamped out with a press have a shape such as that shown in FIG. 3. A split core 24 such as that shown in FIG. 4, i.e., a split core 24 provided with one abutting portion 38 on both the first end portion 30 and the second end portion 32, is formed by flipping the magnetic steel sheets of this shape over partway through the stacking process.

This structure restricts the movement of the split cores 24 in the axial direction when the split cores 24 are arranged in a ring. Therefore, even if the clamping force of the cylindrical body 22 on the split cores 24 is uneven in the process of inserting the split cores 24 into the cylindrical body 22 and shrink fitting the cylindrical body 22, the split cores 24 are suppressed from coming out of position in the axial direction, so roundness can be improved.

In this example embodiment, a case is described in which one abutting portion 38 is provided on both the first end portion 30 and the second end portion 32, but the invention is not limited to this structure. That is, a plurality of the abutting portions 38 may be provided on both the first end portion 30 and the second end portion 32. A plurality of the abutting portions 38 may be formed, for example, by performing this flipping operation during stacking of the magnetic steel sheets a plurality of times in the stacking process. Providing a plurality of abutting portions 38 on both the first end portion 30 and the second end portion 32 makes it possible to more reliably suppress the split cores 24 from coming out of position in the axial direction.

Also, in this example embodiment, a case is described in which the magnetic steel sheets that are stamped out with a press are formed in only one shape, but the invention is not limited to this. The magnetic steel sheets may be formed in a plurality of shapes as long as the abutting portions 38 are formed on the split cores 24. For example, one magnetic steel sheet that is stamped out with a press may be shaped as shown in FIG. 3, and another may be shaped in a minor-reversed image of the shape shown in FIG. 3. In this case, a plurality of abutting portions 38 may be formed on both the first end portion 30 and the second end portion 32 by alternately stacking a predetermined number of each of the magnetic steel sheets having these two different shapes together. Moreover, one of the magnetic steel sheets that is stamped out with a press may be a magnetic steel sheet having a shape without the protruding portion 34 and the depressed portion 36, and a plurality of these magnetic steel sheets having this shape may be stacked between a plurality of stacked steel magnetic sheets having the two different shapes described above.

Next, the structure of the cylindrical body 22 will be described with reference to FIG. 2. The cylindrical body 22 is formed by metal material and has a generally cylindrical shape. The cylindrical body 22 is formed by stamping out steel sheet with a press and forming it into a cylindrical shape by deep-drawing or the like.

The cylindrical body 22 has a cylinder main body 44 and a flange portion 46 at one end of the cylinder main body 44. The flange portion 46 is formed bent radially outward from the cylinder main body 44, and thus is more rigid than the cylinder main body 44. Therefore, in the related art, the clamping force during shrink fitting, particularly the clamping force in the axial direction, may become uneven, which may result in the split cores coming out of position.

Therefore, in the cylindrical body 22 of this example embodiment, a buffer portion 48 that absorbs the effect that the rigidity of the flange portion 46 would have on the cylinder main body 44 is provided between the cylinder main body 44 and the flange portion 46. The buffer portion 48 of this example embodiment is formed such that the radius of at least a portion thereof gradually increases from the cylinder main body 44 toward the flange portion 46.

With this structure, even if the flange portion 46 is more rigid than the cylinder main body 44, the buffer portion 48 absorbs the effect that the rigidity would have on the cylinder main body 44. More specifically, forming the buffer portion 48 as described above gives the buffer portion 48 an obtuse bent portion between the cylinder main body 44 and the flange portion 46, as shown in FIG. 2. This bent portion has an elastic function, so the effect that the rigidity of the flange portion 46 would have on the cylinder main body 44 is able to be absorbed. Accordingly, the structure of the cylindrical body 22 in this example embodiment inhibits the clamping force during shrink fitting, particularly the clamping force in the axial direction, from becoming uneven, and thus inhibits the split cores from coming out of position.

Also, when press forming the cylindrical body 22 by deep-drawing or the like, the other end of the cylinder main body 44 ends up becoming wavy. Therefore, with the related art, the rigidity of the other end of the cylinder main body 44 in the circumferential direction may become uneven, which may result in the clamping force at the other end of the cylinder main body 44 in the circumferential direction during shrink fitting also becoming uneven.

Therefore, with the cylindrical body 22 of this example embodiment, the other end of the cylinder main body 44 is formed with a radius that gradually increases. This shape is obtained after press forming such as deep-drawing or the like. Accordingly, the rigidity thereof in the circumferential direction is able to be even, and as a result, the clamping force thereof in the circumferential direction is able to be even.

Next, a manufacturing method of the stator 14 will be described. First, magnetic steel sheets of a single shape or a plurality of shapes are stamped out with a press. Then the split cores 24 are manufactured by stacking together a predetermined number of the magnetic steel sheets that have been stamped out. All of the split cores 24 that make up the stator core 20 are then simultaneously inserted into the annular coil from the outer peripheral side of the coil. The stator core 20 in this state is then housed inside of the cylindrical body 22, and the cylindrical body 22 is then shrink fitted. The cylindrical body 22 is then heat shrunk by cooling the cylindrical body 22. As a result of this heat shrinking, the split cores 24 and the cylindrical body 22 become integrally and strongly fixed together.

In this example embodiment, a case is described in which the motor 10 is an interior permanent magnet (IPM) motor, but the invention is not limited to this. As long as the stator 14 has the split cores 24, the motor 10 may be another type of motor, such as a reluctance motor or a wound-rotor induction motor.

The invention has been described with reference to example embodiments for illustrative purposes only. It should be understood that the description is not intended to be exhaustive or to limit form of the invention and that the invention may be adapted for use in other systems and applications. The scope of the invention embraces various modifications and equivalent arrangements that may be conceived by one skilled in the art.

What is claimed is:

1. A stator comprising:
  a stator core formed from a plurality of split cores arranged in a circumferential direction, the stator core having a top surface and an opposite bottom surface;
  a cylindrical body that surrounds the stator core from a periphery and secures the stator core, the cylindrical body has a cylinder main body having a first cylinder end, an opposite second cylinder end, and a flange portion that extends radially from the first cylinder end, the cylinder main body is formed such that a radius of the second cylinder end gradually increases from the cylinder main body adjacent the bottom surface of the stator core, said second cylinder end curves outwardly at a position beyond said bottom surface of said stator core; and
  a buffer portion that absorbs an effect that rigidity of the flange portion would have on the cylinder main body, the buffer portion positioned on the cylinder main body between the bottom surface and the top surface of the stator core, the buffer portion configured such that an interior surface of the buffer portion is spaced apart from the periphery of the stator core adjacent said top surface of said stator core, the buffer portion is formed such that a radius of at least a portion of the buffer portion gradually increases from the cylinder main body towards the flange portion, wherein:

the split cores each have a first end portion on one end in the circumferential direction, and a second end portion on the other end in the circumferential direction;

the first end portion has a protruding portion that protrudes outward in the circumferential direction;

the second end portion has a depressed portion that is depressed inward in the circumferential direction and fits together with the protruding portion of the first end portion of an adjacent split core.

2. The stator according to claim 1, wherein the protruding portion is formed so as to gradually become narrower from a base portion of the protruding portion toward an apex portion of the protruding portion; and the depressed portion is formed to correspond to the protruding portion.

3. The stator according to claim 2, wherein the protruding portion of each split core has a trapezoidal shape in which the base portion is a lower base and the apex portion is an upper base, when the split core is viewed from an axial direction.

4. The stator according to claim 1, further comprising an abutting portion at which the first end portion and the second end portion face each other and abut against each other to restrict movement of the split cores in an axial direction when the protruding portion and the depressed portion are fitted together.

5. The stator according to claim 4, wherein each of the split cores is formed from a plurality of magnetic steel sheets that are stacked together; and the abutting portion at which the first end portion and the second end portion face each other and abut against each other is formed by the magnetic steel sheets being flipped over partway through the stack of magnetic steel sheets.

6. The stator according to claim 4, wherein the abutting portion includes an outside surface of the protruding portion in the axial direction and an inside surface of the depressed portion in the axial direction.

7. The stator according to claim 1, wherein each of the plurality of split cores having a plurality of circumferentially spaced teeth extending radially inward from a radially inward side of the split cores.

8. The stator according to claim 1, wherein said flange portion is bent radially outward from said first cylinder end such that said flange portion extends in a direction that is generally normal to a central axis of said cylinder main body.

9. A motor comprising:

a stator including:

a stator core formed from a plurality of split cores arranged in a circumferential direction, the stator core having a top surface and an opposite bottom surface;

a cylindrical body that surrounds the stator core from a periphery and secures the stator core, the cylindrical body has a cylinder main body having a first cylinder end, an opposite second cylinder end, and a flange portion that extends radially from the first cylinder end, the cylinder main body is formed such that a radius of the second cylinder end gradually increases from the cylinder main body adjacent the bottom surface of the stator core, said second cylinder end curves outwardly at a position beyond said bottom surface of said stator core; and a buffer portion that absorbs an effect that rigidity of the flange portion would have on the cylinder main body, the buffer portion positioned on the cylinder main body between the bottom surface and the top surface of the stator core, the buffer portion configured such that an interior surface of the buffer portion is spaced apart from the periphery of the stator core adjacent said top surface of said stator core, the buffer portion is formed such that a radius of at least a portion of the buffer portion gradually increases from the cylinder main body towards the flange portion, wherein:

the split cores each have a first end portion on one end in the circumferential direction, and a second end portion on the other end in the circumferential direction;

the first end portion has a protruding portion that protrudes outward in the circumferential direction;

the second end portion has a depressed portion that is depressed inward in the circumferential direction and fits together with the protruding portion of the first end portion of an adjacent split core.

10. The motor according to claim 9, wherein each of the plurality of split cores having a plurality of circumferentially spaced teeth extending radially inward from a radially inward side of the split cores.

11. The motor according to claim 9, wherein said flange portion is bent radially outward from said first cylinder end such that said flange portion extends in a direction that is generally normal to a central axis of said cylinder main body.

* * * * *